(12) United States Patent
Safiejko (10) Patent No.: US 9,216,778 B1
(45) Date of Patent: Dec. 22, 2015

(54) CAB SUSPENSION

(71) Applicant: International Truck Intellectual Property Company, LLC, Lisle, IL (US)

(72) Inventor: John Lucas Safiejko, North Aurora, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/293,375

(22) Filed: Jun. 2, 2014

(51) Int. Cl.
*B62D 33/06* (2006.01)

(52) U.S. Cl.
CPC .................................. *B62D 33/0608* (2013.01)

(58) Field of Classification Search
CPC ........... B62D 33/0608; B62D 33/0604; B62D 33/067; B60G 2200/31; B60G 2200/341; B60G 2202/112; B60G 2202/1424; B60G 2202/30; B60G 2204/125; B60G 2204/143; B60G 2204/162; B60G 2204/45; B60G 2206/11; B60G 7/001; B60G 7/04; B60G 99/004; B60G 9/003
USPC .......................... 296/190.7, 190.5, 35.1, 1.03; 180/89.13, 89.12, 89.14, 89.15; 280/124.1, 124.11
See application file for complete search history.

(56) References Cited

U.S. PATENT DOCUMENTS

| | | | | |
|---|---|---|---|---|
| 4,275,918 A | * | 6/1981 | Franco | 296/190.07 |
| 4,330,149 A | * | 5/1982 | Salmon | 296/190.05 |
| 5,253,853 A | * | 10/1993 | Conaway et al. | 267/256 |
| 6,109,381 A | | 8/2000 | Stuyvenberg | |
| 6,168,229 B1 | | 1/2001 | Kooi | |
| 6,439,651 B1 | | 8/2002 | Johansson | |
| 6,702,367 B2 | * | 3/2004 | Leitner et al. | 296/190.07 |
| 6,725,957 B2 | | 4/2004 | Sutton | |
| 6,805,215 B2 | | 10/2004 | Puterbaugh | |
| 7,744,149 B2 | | 6/2010 | Murray | |
| 7,950,727 B2 | | 5/2011 | Haeusler | |
| 8,608,234 B2 | * | 12/2013 | Haeusler et al. | 296/190.07 |

FOREIGN PATENT DOCUMENTS

| | | |
|---|---|---|
| WO | 2009096880 | 6/2009 |
| WO | 2010001204 | 7/2010 |
| WO | 2012158146 | 11/2012 |

\* cited by examiner

*Primary Examiner* — Glenn Dayoan
*Assistant Examiner* — Sunsurraye Westbrook
(74) *Attorney, Agent, or Firm* — Jeffrey P. Calfa; Mark C. Bach (57) ABSTRACT

A suspension system for a vehicle cab is disposed between a chassis frame and a cab rear. A cross rail is fastened to the chassis frame sides. A gas spring is mounted laterally centrally of the chassis frame sides on the cross rail. A gas spring is disposed on the base. A damping mechanism damps vertical displacements of the cab on the chassis frame. A multi-limb bar assembly interfaces the cab, the chassis frame, and the gas spring.

19 Claims, 6 Drawing Sheets

CAB SUSPENSION

TECHNICAL FIELD

The disclosed subject matter comprises a suspension system which is disposed between a chassis frame of a motor vehicle and a cab supported on the chassis frame, particularly a suspension system for suspending a rear of a cab, such as that of a heavy truck or other large vehicle, with a selected degree of ride softness/stiffness while maintaining control of cab displacement on the chassis frame in longitudinal (fore-aft) and lateral (side-to-side) directions.

BACKGROUND

Certain heavy truck vehicles have a suspension system through which a rear of a truck cab is supported on an underlying chassis frame. The chassis frame is itself suspended by a suspension system between itself and road wheels on which the truck vehicle travels. The suspension system between the road wheels and the chassis frame is tuned to the load of the truck vehicle supported by the road wheels. In the absence of a suspension system between the rear of the cab and the chassis frame, the full effect of road disturbances transmitted to the chassis frame is also felt by the cab, and hence a cab occupant such as a driver of the truck vehicle, resulting in what might be considered a harsh ride characteristic for the particular truck vehicle.

A suspension system which suspends a cab rear on a chassis frame should provide both longitudinal (fore-aft) control and lateral (side-to-side) control of a cab while controlling vertical displacements between cab and chassis frame so as to alleviate harshness which would otherwise be present in the absence of a cab rear suspension system.

SUMMARY

Disclosed herein is an embodiment of a cab suspension for a vehicle. In one embodiment, the cab suspension is for a vehicle comprising a chassis frame having a length running longitudinally between a front and a rear and a width running laterally between a right side and a left side. A cab is supported on the chassis frame and has a front and a rear. A suspension system is disposed between the chassis frame and the cab rear and comprises a cross rail which is fastened to the chassis frame sides. A gas spring having a base is mounted laterally centrally of the chassis frame sides on the cross rail. A deformable gas chamber which confines a pressurized gas is disposed on the base. A top plate is disposed on the gas chamber opposite the base. A damping mechanism damps vertical displacements of the cab on the chassis frame. A multi-limb bar assembly interfaces the cab, the chassis frame, and the gas spring. The bar assembly comprises a hub fastened to the top plate of the gas spring. A left front limb extends from the hub frontward to a left front constraint disposed laterally outboard of the hub and is attached to the cab rear. A left rear limb extends from the hub rearward to a left rear constraint disposed laterally outboard of the hub and is attached to the chassis frame. A right front limb extends from the hub frontward to a right front constraint disposed laterally outboard of the hub and is attached to the cab rear. A right rear limb extends from the hub rearward to a right rear constraint disposed laterally outboard of the hub and is attached to the chassis frame. At least one gusset bar is spaced from the hub and joins one of the limbs to another of the limbs.

DETAILED DESCRIPTION

Figure 1:
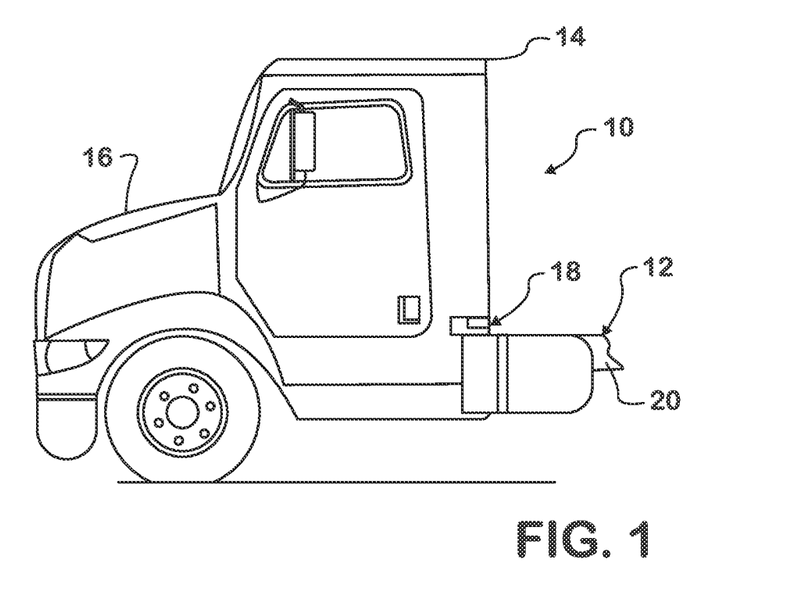
FIG. 1 is a left side elevation view of a portion of a truck vehicle.

FIG. 1 shows a truck vehicle 10 having a chassis frame 12 on which a truck cab 14 is mounted. Frontward of cab 14 is a hood 16 which encloses an engine compartment containing an engine which propels truck vehicle 10. Cab 14 has a front mounting on chassis frame 12 which is not seen in FIG. 1 and a rear mounting which is provided by a suspension system 18 disposed between a rear of cab 14 and chassis frame 12.

Figure 2:
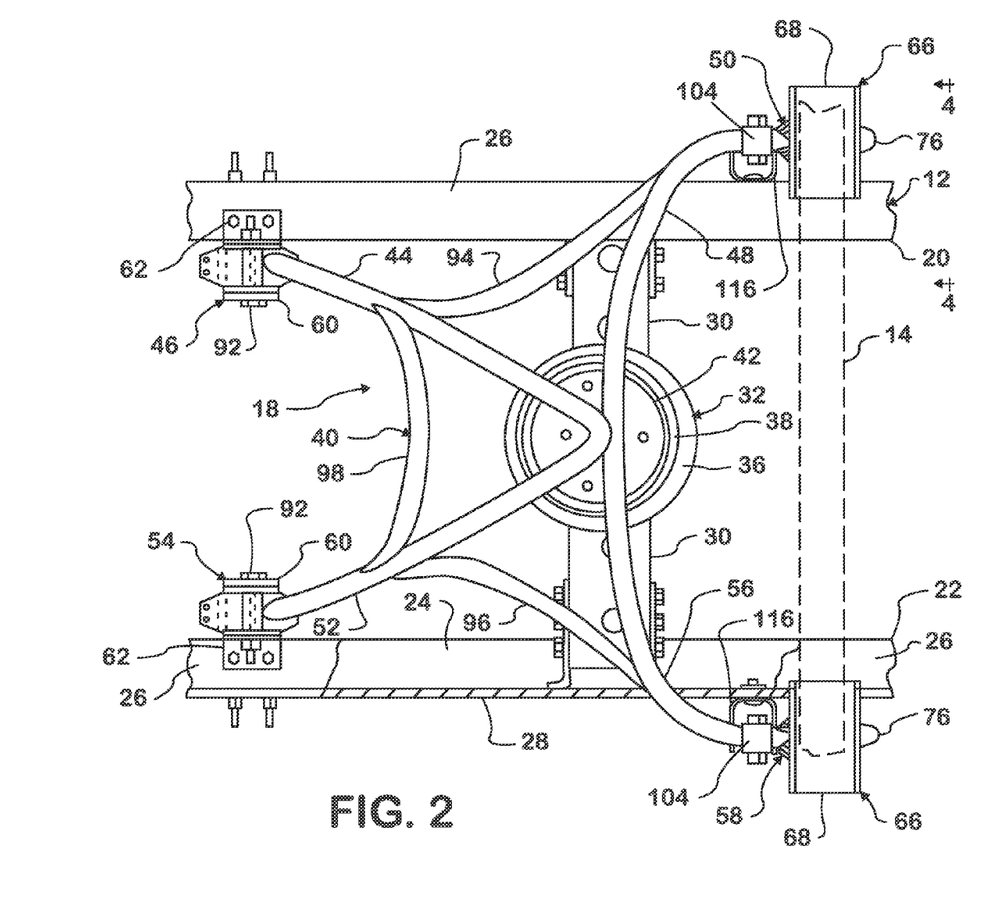
FIG. 2 is a top plan view of a first embodiment of a suspension system which is disposed between a chassis frame and a cab of the truck vehicle.
Figure 3:
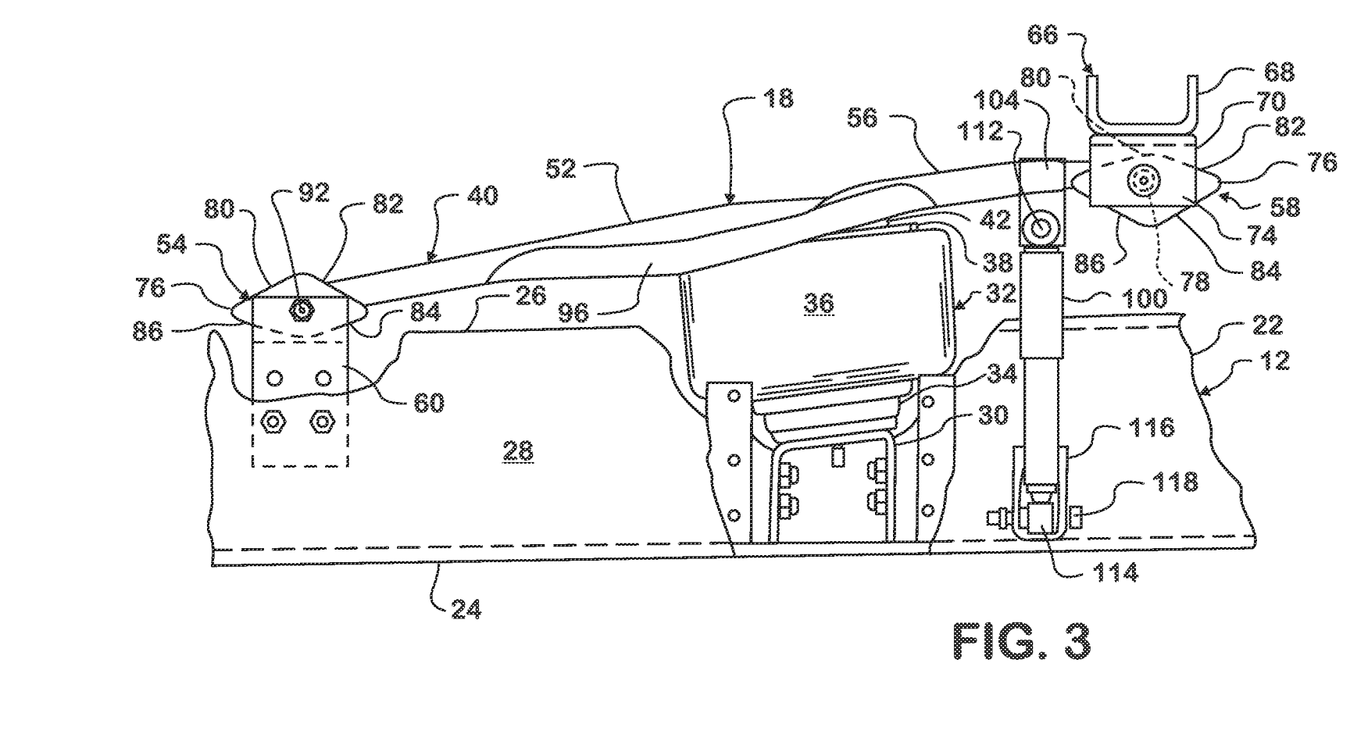
FIG. 3 is a right side elevation view of the suspension system of FIG. 2.

FIGS. 2 and 3 show chassis frame 12 to comprise a left side rail 20 and a right side rail 22 running lengthwise of truck vehicle 10. Each side rail comprises a bottom flange 24 and a top flange 26 both of which are directed laterally inboard from a vertical side 28.

Suspension system 18 comprises a cross rail 30 whose length runs at a right angle to side rails 20, 22 and whose ends are fastened to sides 28.

Suspension system 18 further comprises a gas spring 32 which has a base 34 mounted laterally centrally of chassis frame sides 28 on cross rail 30, a deformable gas chamber 36 which confines a pressurized gas and is disposed on base 34, and a top plate 38 which is disposed on gas chamber 36 opposite base 34.

Suspension system 18 further comprises a multi-limb bar assembly 40 interfacing cab 14, chassis frame 12, and gas spring 32. Bar assembly 40 comprises a hub 42 disposed against and fastened to top plate 38, a left rear limb 44 extending from hub 42 rearward to a left rear constraint 46 disposed on left side rail 20 laterally outboard of hub 42, a left front limb 48 extending from hub 42 frontward to a left front constraint 50 which is disposed laterally outboard of both hub 42 and left rear constraint 46 and which is attached to cab 14 at the cab rear, a right rear limb 52 extending from hub 42 rearward to a right rear constraint 54 disposed on right side rail 22 laterally outboard of hub 42, a right front limb 56 extending from hub 42 frontward to a right front constraint 58 which is disposed laterally outboard of both hub 42 and right rear constraint 54 and which is attached to cab 14 at the cab rear. Each front constraint 50, 58 is also disposed laterally outboard of the respective side rail 20, 22.

Figure 5:
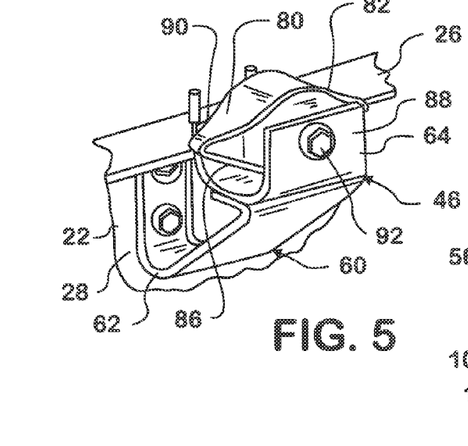
FIG. 5 is an enlarged perspective view of one portion of the first embodiment.

Each rear constraint 46, 54 comprises a two-piece bracket 60 (see FIG. 5 also) having a first piece 62 disposed against and fastened to side 28 and to top flange 26 of the respective side rail 20, 22, and having a shape which supports an upwardly open second piece 64. The two pieces 62, 64 are joined together at flat abutted faces inboard of the side rail near top flange 26.

Each front constraint 50, 58 comprises a two-piece bracket 66 (see FIG. 6 also) having an upwardly open top piece 68 and a downwardly open bottom piece 70 which are joined together at respective flat faces which abut each other. Bottom piece 70 has laterally spaced apart sides 72, 74.

Figure 6:
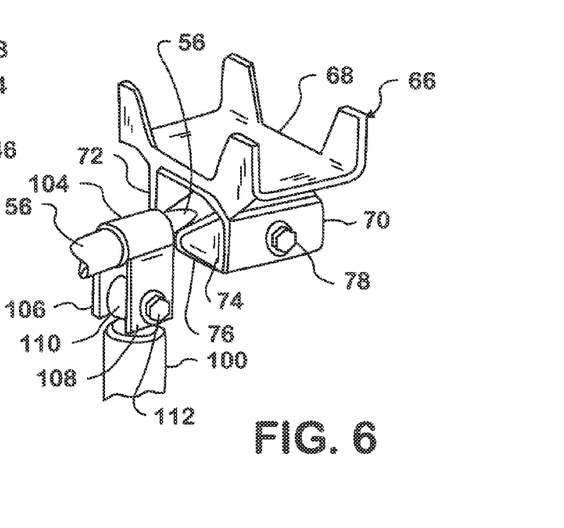
FIG. 6 is an enlarged perspective view of another portion of the first embodiment.

A rocker 76 is disposed between sides 72, 74 on which it is supported by the shank of a bolt 78 which extends horizontally laterally through a hole in one side, through the rocker, and through a hole in the other side.

Figures 8, 10:
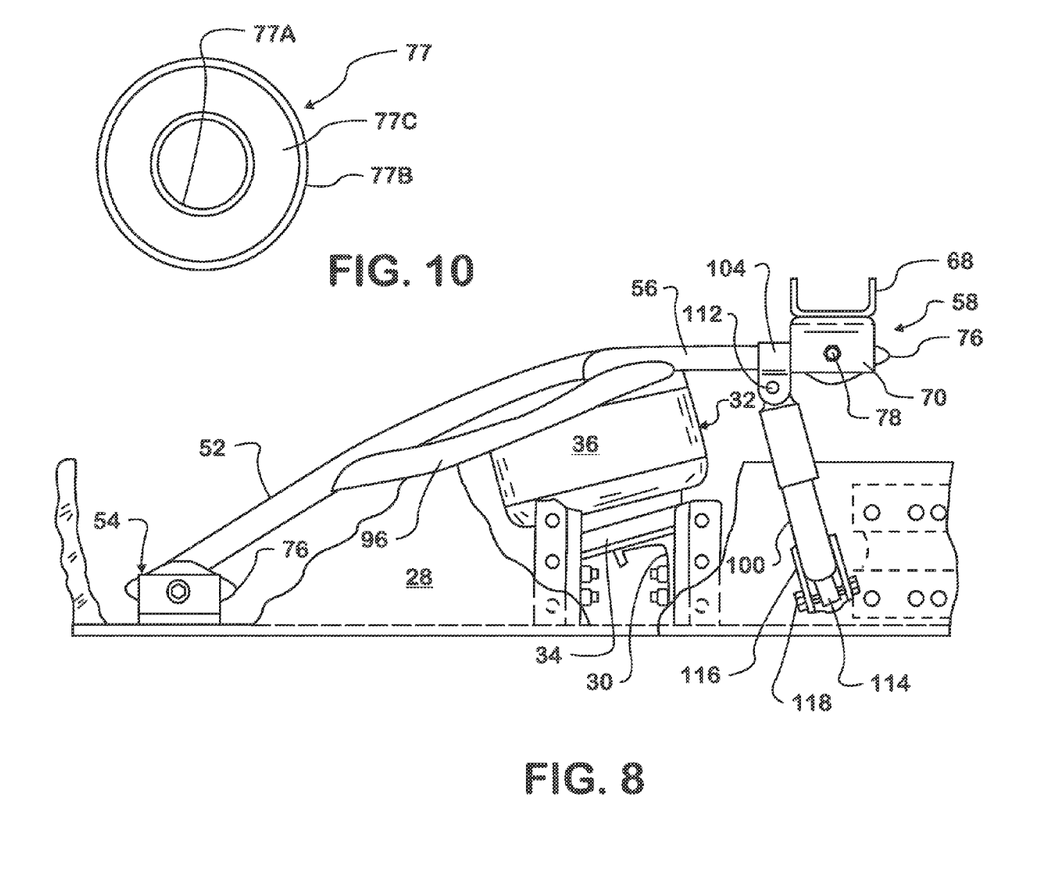
FIG. 8 is a right side elevation view of the suspension system of FIG. 7.
FIG. 10 is an end view of a part which is used in the various embodiments.

Each rocker 76 comprises a through-hole containing an elastomeric bushing 77, shown by itself in FIG. 10. Bushing 77 has an inner metal sleeve 77A through which the shank of bolt 78 passes and an outer metal sleeve 77B which fits within the through-hole in the rocker. An annular elastomer 77C has an inner circumference joined to the outer circumference of inner metal sleeve 77A, and an outer circumference joined to the inner circumference of outer metal sleeve 77B. When torque is applied to tighten bolt 78, sides 72, 74 are forced against the ends of inner metal sleeve 77A, creating a clamp load which causes bottom bracket piece 70 and inner metal sleeve 77A to become engaged as one.

Outer metal sleeve 77B and rocker 76 are also engaged as one, such as by a press-fit, or other type of joint.

A rocker 76, as viewed laterally in FIG. 3, has a generally diamond-shaped four-sided perimeter having sides 80, 82, 84, and 86. An end of each front limb 48, 56 is joined to a respective rocker proximate a corner where sides 80, 86 meet. A rocker 76 can turn either clockwise or counterclockwise about the common axis of the bolt and inner metal sleeve from the position shown in FIG. 3. As a rocker 76 increasingly turns, it does so against increasing elastomeric resistance of elastomer 77C, serving to isolate inputs from the cab. Counterclockwise rotation of each rocker 76 is limited by abutment of side 82 with the flat face of bottom piece 70 which abuts top piece 68. Clockwise rotation is limited by abutment of side 80 with the flat face of bottom piece 70 which abuts top piece 68. Such abutments provide "hard stops" for limiting torsional stresses in elastomer 77C. The elastomeric torsional resistance of elastomer 77C and the hard stops are different functional attributes of a motion constrain mechanism, each providing a different type of constraint.

Each rear constraint 46, 54 also comprises a rocker 76 which is disposed between sides 88, 90 of piece 64 (see FIG. 5) on the shank of a horizontal, laterally extending bolt 92. As viewed in FIGS. 2 and 3, an end of each rear limb 44, 52 is joined to a respective rocker 76 at a location in the vicinity of where rocker sides 82, 84 meet. Each rocker 76 also comprises an elastomeric bushing 77 which functions like the ones described for the rockers of the front constraints.

Counterclockwise rotation of each rocker 76 of rear constraints 46, 54 is limited by abutment of side 86 with the flat face of second piece 64 which is joined to first piece 62, and clockwise rotation is limited by abutment of side 84 with that flat face. Hence, each rear constraint has a motion constraint mechanism like that of the front constraints.

Suspension system 18 further comprises at least one gusset bar spaced from hub 42 and joining one of the limbs to another of the limbs. A left side gusset bar 94 joins left front limb 48 and left rear limb 44 at respective locations spaced from hub 42. A right side gusset bar 96 joins right front limb 56 and right rear limb 52 at respective locations spaced from hub 42. A rear gusset bar 98 joins left rear limb 44 and right rear limb 52 at respective locations spaced from hub 42.

Left side gusset bar 94 joins left front limb 48 at a location which is laterally outboard of a location at which left side gusset bar 94 joins left rear limb 44, and right side gusset bar 96 joins right front limb 56 at a location which is laterally outboard of a location at which right side gusset bar 96 joins right rear limb 52.

Left front limb 48 has a greater extent laterally of hub 42 than frontward of hub 42. Left rear limb 44 has a greater extent rearward of hub 42 than laterally of hub 42. Right front limb 56 has a greater extent laterally of hub 42 than frontward of hub 42. Right rear limb 52 has a greater extent rearward of hub 42 than laterally of hub 42.

Left side gusset bar 94 has a concave curvature which faces generally laterally outboard, but also slightly rearward, along its length, and right side gusset bar 96 has a concave curvature which faces generally laterally outboard, but also slightly rearward, along its length. Rear gusset bar 98 has a concave curvature which faces rearward along its length. Collectively, front limbs 48 and 56 have a concave curvature which faces frontward along their combined lengths. Concave curvatures of illustrated gusset bars should not be construed to imply that other shapes, such as straight shapes, are not contemplated as possible shapes.

Figure 4:
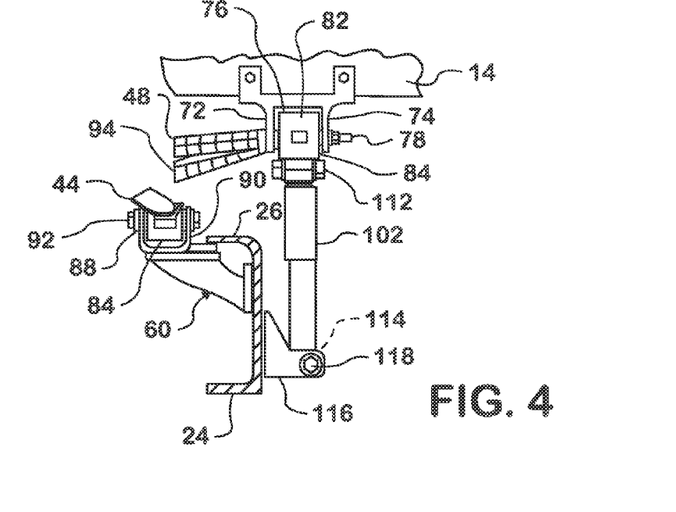
FIG. 4 is a view in the direction of arrows 4-4 in FIG. 2.

A damping mechanism damps vertical displacements of cab 14 on chassis frame 12 and comprises a right damper 100 operatively disposed between chassis frame 14 and right front limb 56 adjacent attachment of the latter to the cab rear via constraint 58, and a left damper 102 (see FIG. 4) operatively disposed between chassis frame 14 and left front limb 48 adjacent the latter's attachment to the cab rear via constraint 58.

A clasp 104 (see FIG. 6) is fastened tightly around each front limb 48, 56 and has spaced apart flanges 106, 108 between which an upper eye 110 of each damper 100, 102 is disposed. Each eye 110 contains an elastomeric bushing, like the ones previously described, through which a bolt 112 passes, allowing eye 110 to turn slightly about a horizontal axis against the elastomeric resistance of the bushing elastomer. Each damper 100, 102 also has a lower eye 114 associated with a side rail mounted bracket 116 through an elastomeric bushing, allowing lower eye 114 to turn slightly about a horizontal longitudinal axis of a bolt 118 against the elastomeric resistance of the bushing elastomer.

Each damper can extend and contract in length between its upper eye 110 and its lower eye 114 to damp vertical displacement of the cab rear relative to chassis frame 12.

The hard stops provided by the motion constraint mechanisms are arranged to prevent the cab rear from bottoming out on the chassis frame and to limit upward displacement of the cab rear from the chassis in the event of a frontal crash impact up to some defined g-force limit. Bar assembly 40 has construction strong enough to remain intact during such an impact event. The bar assembly can be fabricated by conventional techniques such as bending, welding, fixturing, etc. Torsional resistance provided by the elastomeric bushings can contribute to support of the cab in the event of pressure loss from the gas spring.

Figure 7:
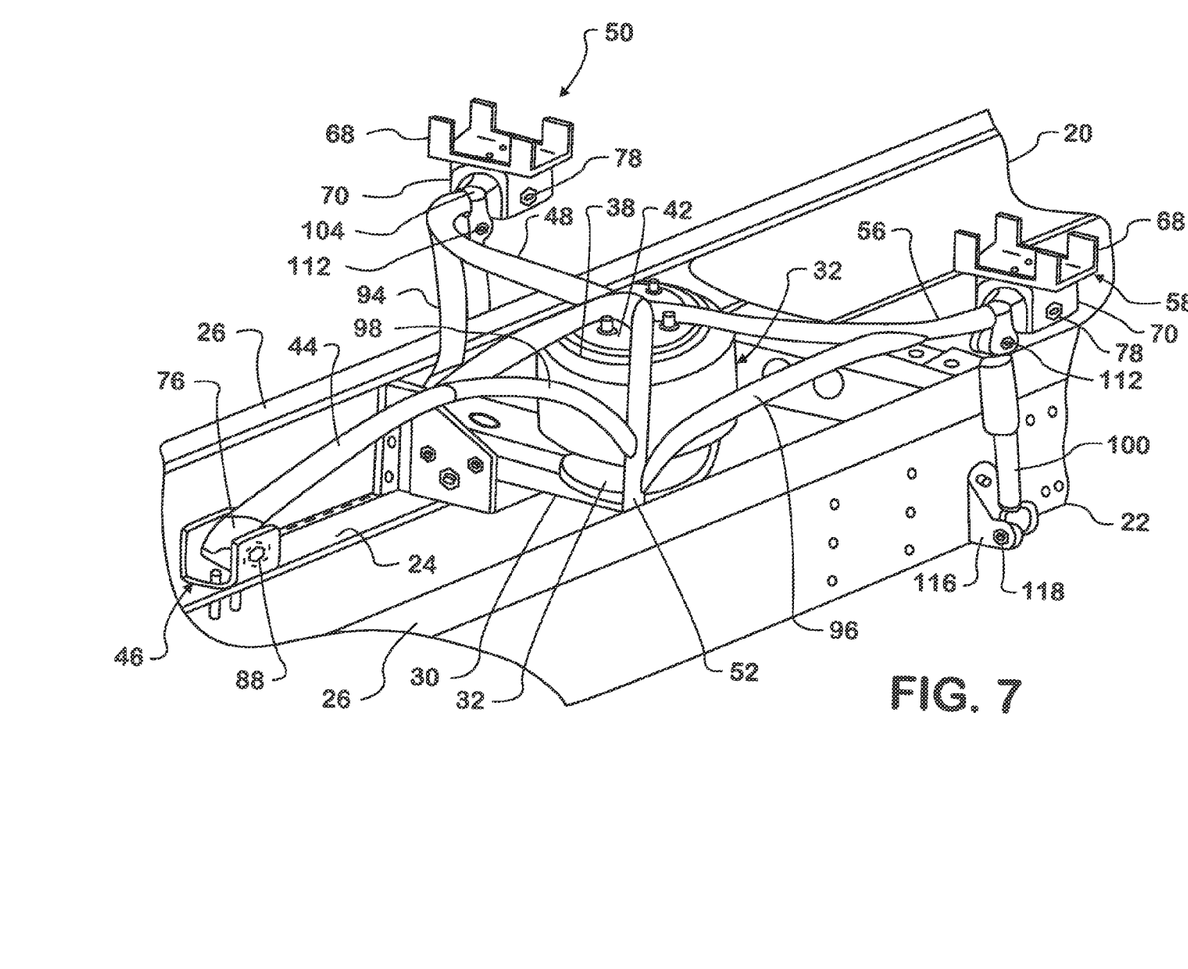
FIG. 7 is a perspective view of a second embodiment of a suspension system looking from the right rear of the truck vehicle toward the left front of the truck vehicle.

FIGS. 7 and 8 show a second embodiment in which the same reference numerals identify the same parts as those of the first embodiment. The second embodiment differs from the first chiefly in that rear constraints 46, 54 mount on lower flange 24 of the respective side rail 20, 22, making bar assembly 40 more curved in side profile than the first embodiment, and in that dampers 100, 102 are slightly inclined from vertical.

Figure 9:
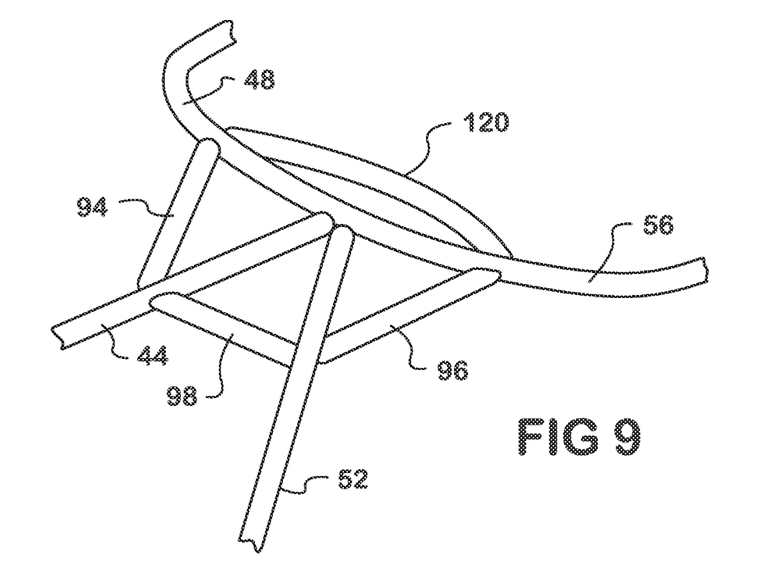
FIG. 9 is a fragmentary perspective view showing a portion of a third embodiment of suspension system.

A third embodiment shown in FIG. 9 illustrating only portions of bars of a bar assembly includes a front gusset bar 120 in addition to the other gusset bars referenced by the same numerals as before.

These different bar assemblies show that different degrees of softness/stiffness in different directions, such as roll stiffness, can be achieved by varying certain constructional details such as the sizes of the bars, the lengths of the bars, and the number of gusset bars used, including the locations of the joints at which a gusset bar joins to other bars. This enables a vehicle to be manufactured to have a particular degree of cab ride softness/stiffness suited for a particular vocation. The disclosed multi-limb bar assemblies replace a known suspension system which has a transverse rod and air spring providing fore-aft and lateral control, but drives inputs from the cab into the bar.

What is claimed is:

1. A vehicle comprising:
   a chassis frame having a length running longitudinally between a front and a rear and a width running laterally between a right side and a left side;
   a cab supported on the chassis frame and having a front and a rear;
   a suspension system which is disposed between the chassis frame and the cab rear and comprises: a cross rail which is fastened to the chassis frame sides; a gas spring having a base mounted laterally centrally of the chassis frame sides on the cross rail, a deformable gas chamber which confines a pressurized gas and is disposed on the base, and a top plate disposed on the gas chamber opposite the base; a damping mechanism which damps vertical displacements of the cab on the chassis frame; and a multi-limb bar assembly interfacing the cab, the chassis frame, and the gas spring, the bar assembly comprising a hub fastened to the top plate of the gas spring, a left front limb extending from the hub frontward to a left front constraint disposed laterally outboard of the hub and attached to the cab rear, a left rear limb extending from the hub rearward to a left rear constraint disposed laterally outboard of the hub and attached to the chassis frame, a right front limb extending from the hub frontward to a right front constraint disposed laterally outboard of the hub and attached to the cab rear, a right rear limb extending from the hub rearward to a right rear constraint disposed laterally outboard of the hub and attached to the chassis frame, and at least one gusset bar spaced from the hub and joining one of the limbs to another of the limbs.

2. A vehicle as set forth in claim 1 in which a left side gusset bar joins the left front limb and the left rear limb at respective locations spaced from the hub, a right side gusset bar joins the right front limb and the right rear limb at respective locations spaced from the hub, and a rear gusset bar joins the left rear limb and the right rear limb at respective locations spaced from the hub.

3. A vehicle as set forth in claim 2 in which the left front limb has a greater extent laterally of the hub than frontward of the hub, the left rear limb has a greater extent rearward of the hub than laterally of the hub, the right front limb has a greater extent laterally of the hub than frontward of the hub, and the right rear limb has a greater extent rearward of the hub than laterally of the hub.

4. A vehicle as set forth in claim 3 in which the left side gusset bar joins the left front limb at a location which is laterally outboard of a location at which the left side gusset bar joins the left rear limb, and the right side gusset bar joins the right front limb at a location which is laterally outboard of a location at which the right side gusset bar joins the right rear limb.

5. A vehicle as set forth in claim 4 in which the left side gusset bar has a concave curvature which faces laterally outboard along its length, and the right side gusset bar has a concave curvature which faces laterally outboard along its length.

6. A vehicle as set forth in claim 2 further comprising a front gusset bar which joins the left front limb and the right front limb at respective locations spaced from the hub.

7. A vehicle as set forth in claim 2 in which the damping mechanism comprises a left damper operatively disposed between the chassis frame and the left front limb adjacent its attachment to the cab rear, and a right damper operatively disposed between the chassis frame and the right front limb adjacent its attachment to the cab rear.

8. A vehicle as set forth in claim 1 in which the left front constraint is disposed laterally outboard of the left rear constraint, and the right front constraint is disposed laterally outboard of the right rear constraint.

9. A vehicle as set forth in claim 8 in which the chassis frame comprises a left side rail and a right side rail each having a bottom flange which is directed laterally inward, and each rear constraint comprises a bracket mounted on the bottom flange of the respective side rail and a motion constraint mechanism which is movable on the bracket and to which the respective rear limb is attached.

10. A vehicle as set forth in claim 9 in which each front constraint comprises a bracket via which the respective front limb is attached to the cab rear and a motion constraint mechanism having a movable part and to which an end of the respective front limb is attached.

11. A vehicle as set forth in claim 10 in which the motion constraint mechanism of each rear constraint has a movable part which is movable on the respective bracket, and to which an end of the respective rear limb is attached, and the movable part of each rear constraint and of each front constraint comprises a rocker pivotally mounted on the respective bracket for coactions with the bracket to limit rotary motion of the rocker about a respective axis which extends widthwise of the chassis frame.

12. A vehicle as set forth in claim 11 in which the bracket of each front constraint is fastened to the cab rear to dispose the respective front constraint laterally outboard of the respective side rail.

13. A vehicle as set forth in claim 8 in which the chassis frame comprises a left side rail and a right side rail each having a top flange which is directed laterally inwardly, and each rear constraint comprises a bracket mounted on the respective side rail and extending vertically higher than the top flange of the respective side rail.

14. A vehicle as set forth in claim 13 in which each front constraint comprises a bracket via which the respective front limb is attached to the cab rear and a motion constraint mechanism that has a movable part which is movable on the bracket and to which an end of the respective front limb is attached.

15. A vehicle as set forth in claim 14 in which each rear constraint comprises a motion constraint mechanism having a movable part which is movable on the respective bracket, and the movable part of each rear constraint and of each front constraint comprises a rocker pivotally mounted on the respective bracket for limited rotary motion about an axis which extends widthwise of the chassis frame.

16. A vehicle as set forth in claim 15 in which the bracket of each front constraint is fastened to the respective side rail to dispose the respective front constraint laterally outboard of the respective side rail.

17. A vehicle as set forth in claim 1 in which each front constraint comprises a front bracket which is attached to the cab rear and a motion constraint mechanism having a movable part which is constrained on the front bracket for pivotal movement about an axis which extends widthwise of the chassis frame and to which an end of the respective front limb is attached, and each rear constraint comprises a rear bracket which is attached to the chassis frame and a motion constraint mechanism having a movable part which is constrained on the rear bracket for pivotal movement about an axis which extends widthwise of the chassis frame and to which an end of the respective rear limb is attached.

18. A vehicle as set forth in claim 17 in which the motion constraint mechanism of each rear constraint and of each front constraint comprises an elastomeric bushing through which the respective movable part of the motion constraint mechanism is torsionally elastomerically coupled with the respective bracket for turning on the respective bracket about the respective axis.

19. A vehicle as set forth in claim 18 in which the movable part of each motion constraint mechanism of each constraint comprises a rocker with which the respective bracket coacts to limit turning of the rocker about the respective axis.

\* \* \* \* \*